(12) United States Patent
Hiraiwa et al.

(10) Patent No.: US 9,051,220 B2
(45) Date of Patent: Jun. 9, 2015

(54) METHOD FOR PRODUCING POWDER MOLDED PRODUCT AND POWDER MOLDED PRODUCT

(75) Inventors: Toshiki Hiraiwa, Nagoya (JP); Hidemi Nakagawa, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 631 days.

(21) Appl. No.: 13/369,664

(22) Filed: Feb. 9, 2012

(65) Prior Publication Data
US 2012/0214942 A1 Aug. 23, 2012

(30) Foreign Application Priority Data

Feb. 21, 2011 (JP) ................. 2011-034072

(51) Int. Cl.

| | | |
|---|---|---|
| *C04B 35/634* | (2006.01) | |
| *C04B 35/632* | (2006.01) | |
| *C04B 35/624* | (2006.01) | |
| *C04B 35/626* | (2006.01) | |
| *C04B 35/63* | (2006.01) | |
| *C04B 35/636* | (2006.01) | |
| *C04B 35/00* | (2006.01) | |
| *C08K 3/22* | (2006.01) | |
| *B28B 3/00* | (2006.01) | |
| *C08K 5/00* | (2006.01) | |
| *C08L 75/04* | (2006.01) | |
| *B28B 1/00* | (2006.01) | |
| *C04B 35/638* | (2006.01) | |
| *B28B 5/00* | (2006.01) | |
| *C08K 3/00* | (2006.01) | |
| *C04B 35/01* | (2006.01) | |

(52) U.S. Cl.
CPC ......... *C04B 35/63456* (2013.01); *C04B 35/632* (2013.01); *C04B 35/624* (2013.01); *C04B 35/6269* (2013.01); *C04B 35/6303* (2013.01); *C04B 35/634* (2013.01); *C04B 35/6365* (2013.01); *C04B 35/00* (2013.01); *C04B 35/636* (2013.01); *C08K 3/22* (2013.01); *B28B 3/00* (2013.01); *C08K 5/00* (2013.01); *C08L 75/04* (2013.01); *B28B 1/00* (2013.01); *C04B 35/638* (2013.01); *B28B 5/00* (2013.01); *C08K 3/00* (2013.01); *C08L 2312/00* (2013.01); *C04B 2235/61* (2013.01); *C08L 2201/00* (2013.01); *C04B 2235/349* (2013.01); *C04B 35/01* (2013.01); *C04B 35/6263* (2013.01); *C04B 35/6264* (2013.01); *C04B 2235/3225* (2013.01); *C04B 2235/3279* (2013.01); *C04B 2235/6022* (2013.01); *C04B 2235/6023* (2013.01); *C04B 2235/6025* (2013.01); *C04B 2235/606* (2013.01)

(58) Field of Classification Search
CPC .............. B28B 1/00; B28B 3/00; B28B 5/00; C04B 35/00; C04B 35/01; C04B 35/624; C04B 35/62; C04B 35/6263; C04B 35/6264; C04B 35/6269; C04B 35/6303; C04B 35/632; C04B 35/634; C04B 35/63456; C04B 35/636; C04B 35/6365; C04B 35/638; C04B 2235/3225; C04B 2235/3279; C04B 2235/349; C04B 2235/6022; C04B 2235/6023; C04B 2235/6025; C04B 2235/606; C04B 2235/61; C08L 75/04; C08L 2201/00; C08L 2312/00; C08K 3/00; C08K 3/22; C08K 5/00
USPC ................... 264/603, 612, 670; 524/507, 590
See application file for complete search history.

(56) References Cited

U.S. PATENT DOCUMENTS

| | | | |
|---|---|---|---|
| 5,733,499 A | 3/1998 | Takeuchi et al. | |
| 5,955,392 A | 9/1999 | Takeuchi et al. | |
| 6,045,748 A | 4/2000 | Hayashi | |
| 6,403,001 B1 | 6/2002 | Hayashi | |
| 2009/0209700 A1 | 8/2009 | Kimura et al. | |
| 2010/0194003 A1* | 8/2010 | Shimogawa et al. | 264/618 |

FOREIGN PATENT DOCUMENTS

| | | |
|---|---|---|
| JP | 03-252304 A1 | 11/1991 |
| JP | 07-186116 A1 | 7/1995 |
| JP | 08-238613 A1 | 9/1996 |
| JP | 10-130076 A1 | 5/1998 |
| JP | 11-048222 A1 | 2/1999 |
| JP | 11-302302 A1 | 11/1999 |
| JP | 2001-335371 A1 | 12/2001 |
| JP | 2003-147495 A1 | 5/2003 |
| JP | 2005-193573 A1 | 7/2005 |
| JP | 2010-241129 A1 | 10/2010 |
| WO | 2009/104703 A1 | 8/2009 |

OTHER PUBLICATIONS

International Search Report and Written Opinion dated Apr. 24, 2012.

* cited by examiner

*Primary Examiner* — Patrick Niland
(74) *Attorney, Agent, or Firm* — Burr & Brown, PLLC

(57) ABSTRACT

A powder molded product produced through molding of a slurry containing a powdery molding raw material, a dispersion medium for dispersing the molding raw material, a dispersant for uniformly dispersing the molding raw material in the dispersion medium, a binder precursor for producing an organic binder through a chemical reaction, a reaction promoter for promoting the chemical reaction, and a pseudo-plasticity-imparting agent for imparting pseudo-plasticity to the slurry. The method for producing a powder molded product of the present invention includes a slurry preparation step; a molding step of molding the prepared slurry into a primary molded product having a specific shape; and a drying-solidification step of solidifying the slurry by promoting the aforementioned chemical reaction in the primary molded product, and removing, through evaporation, the dispersion medium from the primary molded product.

11 Claims, 4 Drawing Sheets

(Poly)isocyanate    Polyol

⇩ Reaction

Urethane group    Urethane group

Urethane resin

METHOD FOR PRODUCING POWDER MOLDED PRODUCT AND POWDER MOLDED PRODUCT

BACKGROUND OF THE INVENTION

1. Field of the Invention

The present invention relates to a method for producing a powder molded product from a slurry containing a powdery molding raw material, and to a powder molded product produced through molding of the slurry.

2. Description of Related Art

There have been known various methods for producing such a molded product. Among these methods, widely employed is a technique in which a primary molded product (a preliminary molded product differing from the below-described "green product," which is a final powder molded product just before sintering) is formed through a widely known technique (e.g., injection molding or sheet molding) from a slurry containing raw material powder, an organic binder, and a dispersion medium, and the primary molded product is dry-solidified to thereby produce an unsintered powder molded product (hereinafter referred to as a "green product" (see, for example, Japanese Patent Application Laid-Open (kokai) No. H08-238613). Thus, when such a green product is subsequently sintered, a molded product of interest is produced.

Such a conventionally well-known production method poses a problem in that difficulty is encountered in producing molded products of complex shapes and that when the green product is formed through dry-solidification, relatively large shrinkage occurs in the molded product (hereinafter such shrinkage may be referred to as "drying shrinkage"). Such drying shrinkage is mainly caused by a reduction in distance between organic binder molecules associated with volatilization of a dispersion medium. When relatively large shrinkage occurs in a powder molded product, naturally, a large "variation" occurs in the degree of shrinkage (hereinafter may be referred to as "percent drying shrinkage") of the molded product. When the percent drying shrinkage of a green product is high, or the "variation" of the percent drying shrinkage is large, a final molded product produced through sintering of the green product exhibits poor dimensional accuracy.

In order to solve such a problem, the present applicant previously proposed a method for producing a powder molded product (green product) through so-called "gel cast molding" (see, for example, Japanese Patent Application Laid-Open (kokai) No. H11-48222, H11-302302, 2001-335371, or 2010-241129, or International Publication WO 2009/104703). The production method disclosed in International Publication WO 2009/104703 includes the following steps: (1) preparing a slurry containing raw material powder, an isocyanate, a polyol, a urethane reaction catalyst, a dispersion medium, and a dispersant; (2) molding the slurry into a product through any known technique; and (3) dry-solidifying the resultant molded product.

In such a production method, when the molded product is dry-solidified, a urethane resin serving as an organic binder is produced through chemical reaction (urethane reaction) between unreacted isocyanate and polyol, resulting in gelation (solidification) of the slurry.

Through gel cast molding, molded products of complex shapes can easily be produced, since a slurry which is not gelled and has high fluidity is cast-molded. Through gelation after cast molding, a green product having a sufficient strength for enduring rough handling after mold releasing. As this gelation proceeds, cross-linking occurs between urethane groups (—O—CO—NH—) of adjacent urethane resin molecules. This cross-linking forms a strong network between urethane resin molecules. Therefore, even when volatilization of the dispersion medium proceeds, the distance between urethane resin molecules is less likely to be reduced, and thus the molded product exhibits low percent drying shrinkage.

SUMMARY OF THE INVENTION

However, the aforementioned gel cast molding technique requires a gelation (curing) time sufficient for attaining gelation to such an extent that a green product endures a mold releasing process and rough handling after mold releasing. Therefore, in a conventional gel cast molding process, segregation in composition of a slurry due to difference in specific weight of slurry ingredients (i.e., a heavier component sediments more rapidly) may occur during curing. When such compositional segregation occur, the obtained molded products have varied or deteriorated characteristics. Particularly in the case where the raw material powder is formed from a plurality of components (a plurality of powdered ceramic materials or powders of the same ceramic material having different particle sizes), the aforementioned compositional segregation readily occurs.

The present invention has been conceived in order to solve the aforementioned problems. Thus, an object of the present invention is to produce a powder molded product (green product) having excellent characteristics by preventing, to a minimum possible extent, compositional segregation of a slurry due to difference in specific weight of slurry components during curing in the gel cast molding technique.

The powder molded product of the present invention is produced through molding of a slurry containing a powdery molding raw material (e.g., ceramic powder, metal powder, transition metal compound powder serving as a ceramic raw material, or a powder mixture thereof), a dispersion medium for dispersing the powders, a dispersant for uniformly dispersing the molding raw material in the dispersion medium, a binder precursor for producing an organic binder (synthetic resin binder) through a chemical reaction, and a reaction promoter for promoting the chemical reaction. The dispersion medium is nonreactive (i.e., not directly responsible for the chemical reaction of the binder precursor), and may also serve as a solvent for the dispersant, the binder precursor, or the reaction promoter.

The aforementioned chemical reaction may be, for example, polymerization reaction or cross-linking reaction. Therefore, the reaction promoter employed may be a catalyst or a polymerization initiator. When the chemical reaction involves urethane reaction, the binder precursor is urethane precursors (e.g., a polyol and an isocyanate) which produce a urethane resin (i.e., the organic binder) through urethane reaction, and the reaction promoter is a urethane reaction catalyst. As used herein, the term "isocyanate" refers to a compound having an isocyanate group (—N=C=O); the term "polyol (polyhydric alcohol)" refers to a compound having a plurality of alcoholic hydroxyl groups (—OH) (including a compound having an additional functional group such as an amino group); and the term "urethane reaction" refers to polyaddition reaction between an alcoholic hydroxyl group and an isocyanate group.

The method for producing a powder molded product of the present invention comprises:

a slurry preparation step of preparing a slurry containing the aforementioned molding raw material, dispersion medium, dispersant, binder precursor, and reaction promoter;

a molding step of molding the prepared slurry into a primary molded product having a specific shape; and a drying-solidification step of solidifying the slurry by promoting the aforementioned chemical reaction in the primary molded product, and removing, through evaporation, the dispersion medium from the primary molded product (as used herein, the term "drying-solidification" includes gelation and curing). Meanwhile, a first molding raw material and a second molding raw material different from the first molding raw material may be contained in the molding raw material.

The powder molded product of the present invention is produced by molding a slurry containing the aforementioned molding raw material, dispersion medium, dispersant, binder precursor, and reaction promoter.

One characteristic feature of the present invention resides in that a pseudo-plasticity-imparting agent for imparting pseudo-plasticity to a slurry is added to the slurry. As used herein, the term "pseudo-plasticity" refers to a viscosity-related property of a material as follows. That is, when a low shear rate is imparted to the material, the material exhibits high viscosity, whereas when the shear rate increases, the viscosity drastically decreases (see Japanese Patent Application Laid-Open (kokai) No. H10-130076).

The slurry which is subjected to the molding step may contain the organic binder which has already been produced from the binder precursor through the chemical reaction; i.e., the organic binder may be partially produced from the binder precursor before the drying-solidification step. The drying-solidification step may be divided into two steps; i.e., a solidification step of mainly solidifying the slurry by promoting the chemical reaction, and a drying step of mainly removing the dispersion medium through evaporation. In this case, there may be provided, between the solidification step and the drying step, a mold-releasing step of releasing the solidified primary molded product from a mold (e.g., a die). The dispersion medium remaining in the primary molded product released through the mold-releasing step, which has been solidified through the solidification step, is removed through evaporation in the subsequent drying step.

Also, the drying-solidification step may be a step of heating the primary molded product. The heating step may be partially carried out during the molding step. That is, the primary molded product may be heated in a mold or molding machine employed in the molding step.

According to the present invention, through the drying-solidification step, the slurry gelates (solidifies), in the primary molded product produced from the slurry, through production of the organic binder from the binder precursor by the action of the reaction promoter, and the dispersion medium is removed through evaporation from the molded product. In the drying-solidification step, a urethane resin (i.e., the organic binder) may be produced through urethane reaction between a polyol and an isocyanate.

According to the present invention, pseudo-plasticity is imparted to a composite slurry (containing an organic component and/or a plurality of raw materials) subjected to for gel cast molding. As a result, the slurry exhibits low viscosity suitable for molding when high shear rate is given thereto, whereas when the slurry is allowed to stand after the molding process, the slurry exhibits high viscosity due to low shear rate. Thus, according to the present invention, compositional segregation of the slurry due to difference in specific weight of slurry components can be effectively prevented, while excellent molding performance is maintained.

In order to maintain excellent molding performance, the viscosity of the slurry is preferably 1,000 cP or less during molding. However, when the viscosity of the slurry during molding is excessively low, difficulty is encountered in handling of the slurry (e.g., impairment of dispersion stability of slurry, leakage of slurry from the cast during casting, etc.). On the other hand, the viscosity in a static state is preferably 5,000 cP or more (more preferably 20,000 cP or more) from the viewpoint of effectively preventing compositional segregation.

Thus, the aforementioned slurry is preferably prepared so as to exhibit a viscosity (in a static state) of 5,000 cP or more at a shear rate of 1 $sec^{-1}$ or less, and a viscosity (in molding) of 1,000 cP or less at a shear rate of 20 $sec^{-1}$ or more. In this case, specifically, the pseudo-plasticity-imparting agent in an amount of 1 part by weight or more and less than 3 parts by weight is added to the molding raw material in an amount of 100 parts by weight.

More preferably, the aforementioned slurry is prepared so as to exhibit a viscosity of 20,000 cP or more at a shear rate of 1 $sec^{-1}$ or less, and a viscosity of 1,000 cP or less at a shear rate of 20 $sec^{-1}$ or more. In this case, specifically, the pseudo-plasticity-imparting agent in an amount of 2 parts by weight or more and less than 3 parts by weight is added to the molding raw material in an amount of 100 parts by weight.

As described above, according to the present invention, a powder molded product (green product) having excellent characteristics can be produced by preventing, to a minimum possible extent, compositional segregation of a slurry due to difference in specific weight of slurry components during curing in the gel cast molding technique.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which.

DETAILED DESCRIPTION OF THE INVENTION

Figure 1A:
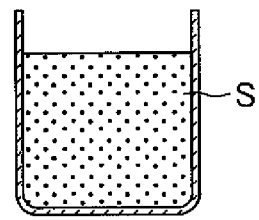
FIGS. 1A to 1D schematically show an embodiment of the production method of the present invention.

Preferred embodiments of the present invention will next be described with reference to examples and comparative examples. The following description of the embodiments is nothing more than the specific description of mere example embodiments of the present invention to the possible extent in order to fulfill description requirements (descriptive requirement and enabling requirement) of specifications required by law.

Thus, as will be described later, naturally, the present invention is not limited to the specific configurations of embodiments and examples to be described below. Modifications that can be made to the embodiments and examples are collectively described herein principally at the end, since insertion thereof into the description of the embodiments would disturb understanding of consistent description of the embodiments.

<Summary of Production Method>

FIGS. 1A to 1D schematically show an embodiment of the production method of the present invention. FIG. 2A is a schematic cross-sectional view showing the components of the slurry S shown in FIG. 1A. Referring to FIGS. 1A to 1D and FIG. 2A, in this embodiment, a powder molded product (ceramic green product) PC is produced through the below-described procedure.

(Step 1: Slurry Preparation Step)

A slurry S is prepared from, as essential components, a powdery ceramic raw material 1 (which may contain two or more ceramic raw materials 1a, 1b, etc. as shown in FIG. 2A); an isocyanate 2a and a polyol 2b, serving as binder precursors; a catalyst 3; and a dispersion medium 4. The ceramic raw material 1 is dispersed in the dispersion medium 4. The isocyanate 2a, the polyol 2b, and the catalyst 3 are dissolved in the dispersion medium 4. In this case, a dispersant 5 is added for the purpose of reliably and uniformly dispersing the ceramic raw material 1 (1a, 1b) in the dispersion medium 4.

In the present embodiment, a pseudo-plasticity-imparting agent 6 (may be also referred to as a "rheology-controlling agent") is added to the slurry S. The pseudo-plasticity-imparting agent 6 imparts to the slurry low viscosity suitable for molding (at high shear rate), and high viscosity in a static state after molding (at low shear rate). Specifically, the pseudo-plasticity-imparting agent 6 is added to the slurry S so the slurry exhibits a viscosity of 1,000 cP or less at a shear rate of 20 $\sec^{-1}$ or more, and a viscosity of 5,000 cP or more (more preferably 20,000 cP or more) at a shear rate of 1 $\sec^{-1}$ or less (the type and amount of the pseudo-plasticity-imparting agent 6 will be described hereinbelow).

(Step 2: Molding Step)

Figure 1B:
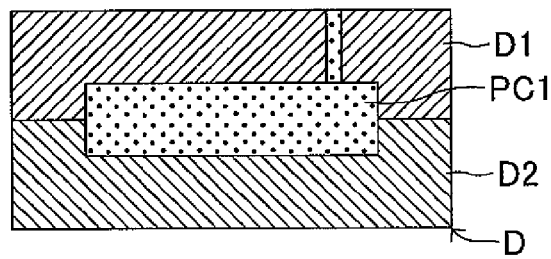
Figure 2A:
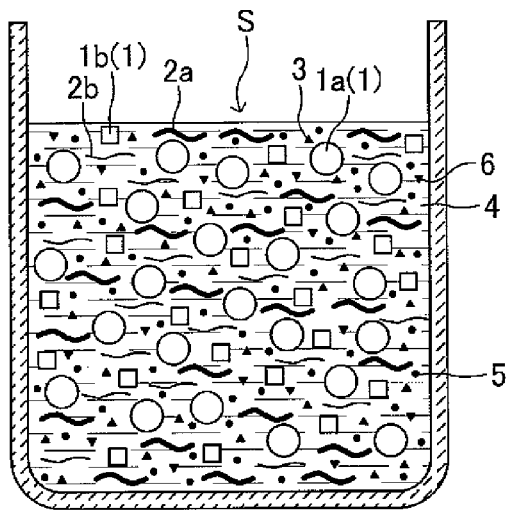
FIG. 2A is a schematic cross-sectional view of the components of the slurry shown in FIG. 1A.

The slurry S prepared through step 1 is molded, through a well-known molding technique, into a primary molded product PC1 having a specific shape (see FIG. 1B). The slurry S exhibits good fluidity suitable for molding into a complex shape by shear force applied thereto during molding. Thus, the primary molded product PC1 is suitably molded.

(Step 3: Drying-solidification Step)

Figure 1C:
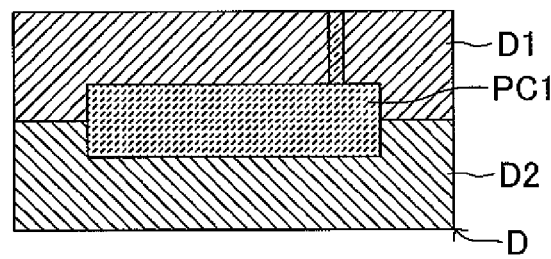

The primary molded product PC1 produced through the aforementioned molding technique is allowed to stand at ambient temperature (see FIG. 1C). Thus, chemical reaction between the isocyanate 2a and the polyol 2b (urethane reaction: see FIG. 2B) proceeds, whereby a urethane resin 2 serving as an organic binder is produced, and the slurry S forming the primary molded product PC1 solidifies (gelates). At this time, the slurry S which forms the primary molded product PC1 is allowed to stand at start of gelation and exhibits high viscosity. Therefore, sedimentation of the ceramic raw material 1 during gelation can be effectively prevented. Particularly when the slurry S contains two or more ceramic raw materials 1a, 1b, . . . , segregation due to difference in specific weight can be effectively prevented.

Figure 1D:
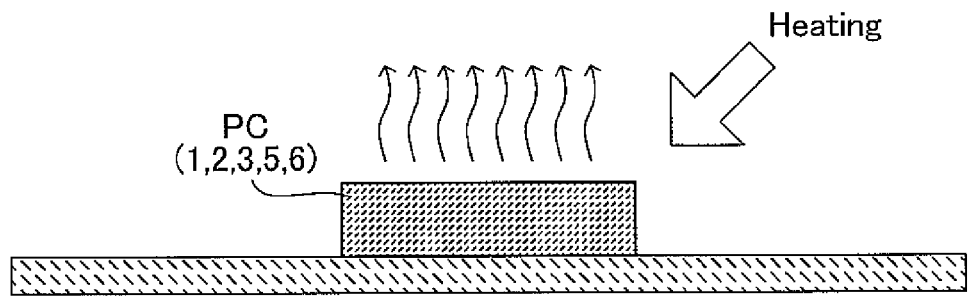

Thereafter, the molded product is released from a mold and heated in a dryer for a specific period of time (see FIG. 1D). With this heating, the dispersion medium 4 is removed through evaporation. Thus, the primary molded product PC1 is dried and solidified under heating, to thereby produce a powder molded product PC containing the ceramic raw material 1 (1a, 1b), the urethane resin 2, the catalyst 3, the dispersant 5, and the pseudo-plasticity-imparting agent 6. The organic components (e.g., the urethane resin 2, the catalyst 3, the dispersant 5, and the pseudo-plasticity-imparting agent 6) contained in the powder molded product PC are removed through, for example, decomposition or scattering during sintering performed subsequent to the drying-solidification step.

Next will be described the respective steps in more detail.

(Details of Step 1)

The ceramic raw material 1 (1a, 1b) corresponding to the "molding raw material" of the present invention may be an oxide ceramic material or a non-oxide ceramic material. For example, the ceramic raw material employed may be metal compound powder (e.g., $ZrO_2$, $Al_2O_3$, NiO, ZnO, MgO, CaO, $SnO_2$, $SiO_2$, $Y_2O_3$, $Fe_2O_3$, $Co_3O_4$, $BaTiO_3$, $SrTiO_3$, PZT, SiC, TiC, $Si_3N_4$, TiN, or AlN) which forms a ceramic material having an intended composition through sintering. No particular limitation is imposed on the particle size of the ceramic raw material 1 (1a, 1b), so long as the slurry S can be prepared from the ceramic raw material (i.e., the ceramic raw material can be dispersed in the dispersion medium 4 in a stable state).

Figure 2B:
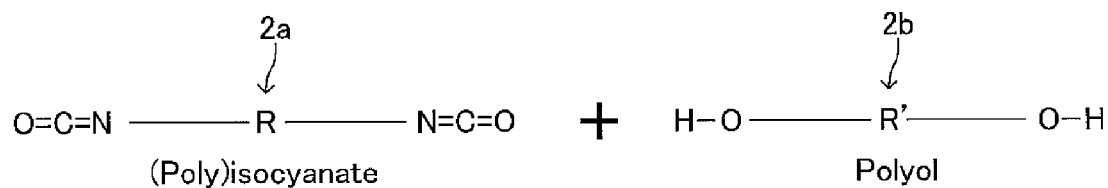
FIG. 2B schematically shows a chemical reaction for producing a urethane resin (serving as an organic binder) from binder precursors, which are components of the slurry shown in FIG. 2A.
Figure 2B:
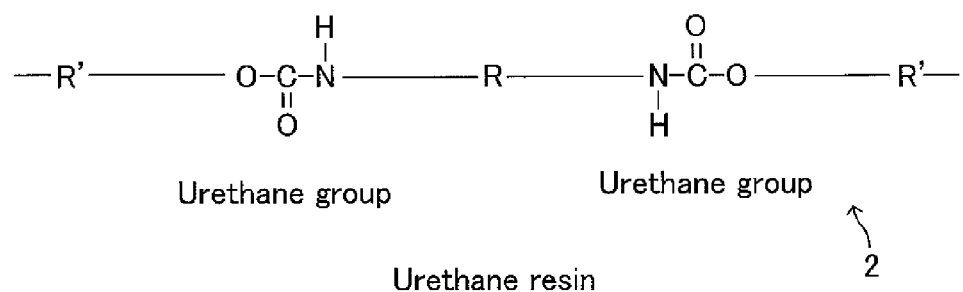

No particular limitation is imposed on the isocyanate 2a, so long as it is a substance having an isocyanate group as a functional group (the isocyanate 2a is particularly preferably a polyisocyanate having a plurality of isocyanate groups as exemplified in FIG. 2B). Specifically, the isocyanate 2a may be, for example, tolylene diisocyanate (TDI), diphenyl-methane diisocyanate (MDI), or a modified product thereof. Alternatively, the isocyanate 2a may be an isocyanate having, in the molecule thereof, a reactive functional group other than an isocyanate group.

No particular limitation is imposed on the polyol 2b, so long as it is a substance having, as a functional group, a plurality of alcoholic hydroxyl groups. Examples of employable substances include ethylene glycol (EG), polyethylene glycol (PEG), propylene glycol (PG), polypropylene glycol (PPG), polytetramethylene ether glycol (PTMG), polyhexamethylene glycol (PHMG), and polyvinyl butyral (PVB).

No particular limitation is imposed on the catalyst 3, so long as it is a substance which promotes urethane reaction. Examples of employable substances include triethylenediamine, hexanediamine, and 6-dimethylamino-1-hexanol.

No particular limitation is imposed on the dispersion medium 4, so long as it is a substance which dissolves the isocyanate 2a, the polyol 2b, the catalyst 3, and the dispersant 5, and which has a molecular weight of 150 or more (more preferably 160 or more). Examples of employable substances include esters such as dimethyl glutarate, triacetin, ethylene glycol monobutyl ether acetate, diethylene glycol monobutyl ether acetate, and propylene glycol monomethyl ether acetate. Particularly preferred is a substance having two or more ester bonds, such as a polybasic acid ester (e.g., dimethyl glutarate) or an acid ester of a polyhydric alcohol (e.g., triacetin).

The dispersant 5 may be, for example, a polycarboxylic acid copolymer, a polycarboxylate, a sorbitan fatty acid ester, a polyglycerin fatty acid ester, a phosphate copolymer, a sulfonate copolymer, or a polyurethane-polyester copolymer having tertiary amine. Particularly preferred is, for example, a polycarboxylic acid copolymer or a polycarboxylate. Addition of the dispersant 5 can reduce the viscosity of the slurry S and impart high fluidity thereto before molding of the slurry S.

The pseudo-plasticity-imparting agent 6 is a known compound, and a variety of products are available on the market. Examples of the pseudo-plasticity-imparting agent include modified acrylic agents, modified urea agents, and polyamide agents. The pseudo-plasticity-imparting agent is appropriately selected from these agents in accordance with the type of the dispersion medium 4 or the like. Specific examples of the pseudo-plasticity-imparting agent 6 which may be employed in the invention include SN Thickener 630, SN Thickener 634, SN Thickener 641, SN Thickener 4050 (products of San Nopco Limited), BYK-410, BYK-425, and BYK-430 (products of BYK).

(Details of Step 2)

FIG. 1B represents a step of injecting the slurry S into a cavity provided between an upper die block D1 and a lower die block D2 of a die D. The primary molded product PC1 produced through this step contains at least the ceramic material 1 (1a, 1b), the isocyanate 2a, the polyol 2b, the catalyst 3, the dispersion medium 4, the dispersant 5, and the pseudo-plasticity-imparting agent 6. The molded product may contain the urethane resin 2, which is produced through reaction between a portion of the isocyanate 2a and a portion of the polyol 2b. That is, urethane reaction may partially proceed during step 1 and/or step 2.

(Details of Step 3)

As gelation proceeds, cross-linking occurs between urethane groups (—O—CO—NH—) of adjacent molecules of the urethane resin 2. This cross-linking forms a strong network between molecules of the urethane resin 2. Therefore, even when the dispersion medium 4 remaining in the primary molded product PC1 volatilizes under heating, reduction of the distance between molecules of the urethane resin 2 is suppressed to a minimum possible extent. Thus, when the powder molded product PC is produced from the primary molded product PC1 through step 3, percent drying shrinkage and the variation thereof can be reduced to a minimum possible extent.

As shown in FIG. 1, step 3 (drying-solidification step) may be divided into two steps; i.e., a gelation step of mainly allowing gelation (solidification) of the slurry to proceed by promoting the corresponding chemical reaction (see FIG. 1C), and a drying step of mainly removing the dispersion medium through evaporation (see FIG. 1D). In this case, the gelation step is carried out before removal of the primary molded product PC1 from the die D. In addition, there is carried out, between the gelation step and the drying step, a mold-releasing step of releasing the primary molded product PC1 from the die D, the molded product PC being stable in shape (attributed to gelation) even after having been released from the die D. The dispersion medium remaining in the primary molded product PC1 released through the mold-releasing step is removed through evaporation in the subsequent drying step.

<Specific Examples>

Next, a specific embodiment of the aforementioned production method will be described, along with the evaluation thereof.

A mixture of NiO powder and $Y_2O_3$ powder ($NiO:Y_2O_3$ (mol)=2:1) (100 parts by weight), a polycarboxylic acid copolymer serving as a dispersant (3 parts by weight), and a dispersion medium (a mixture of triacetin and organic acid dibasic ester (1:9)) (28 parts by weight) were mixed together by means of a ball mill for 14 hours. Then, a predetermined amount (see the below-described Table 1) of a pseudo-plasticity-imparting agent (BYK-430, product of BYK) was added to the thus-obtained primary mixture. The resultant secondary mixture was further mixed with urethane precursors (5 parts by weight) and a catalyst (0.2 parts by weight), followed by defoaming under vacuum, to thereby prepare a ceramic slurry having pseudo-plasticity. The urethane precursors (binder precursors) employed were an isocyanate and a polyol. The isocyanate was 4,4'-diphenylmethane diisocyanate, and the polyol was ethylene glycol (EG).

The ceramic slurry was formed, through the aforementioned injection molding technique, into a primary molded product having a square shape (100 mm×100 mm) and a thickness of 2 mm. After completion of molding, the primary molded product was allowed to stand at ambient temperature for two hours, and then released from the molding die, followed by sufficient drying and solidification in a dryer under heating at 80° C. for 12 hours, to thereby produce a ceramic green molded product.

Table 1 shows experimental results, specifically, the compositional segregation and viscosity at a predetermined shear rate (1 $sec^{-1}$ and 20 sec) of a sintered ceramic molded product at a given amount of the pseudo-plasticity-imparting agent added (% by mass, with respect to 100 parts by mass of ceramic powder mixture). In Table 1, when the amount of pseudo-plasticity-imparting agent added [wt. %] is 0.5, the amount of added pseudo-plasticity-imparting agent is 0.5 parts by weight. The "compositional segregation [wt. %]" was calculated from the difference between the element composition of the top surface of the sintered ceramic green product and that of the bottom surface of the same product. The top and bottom surfaces were buffed, and the element composition was determined through X-ray fluorescence.

TABLE 1

| Pseudo-plasticity-imparting agent Amount [wt. %] | 0 | 0.25 | 0.5 | 1.0 | 2.0 | 3.0 |
|---|---|---|---|---|---|---|
| Compositional segregation [wt. %] | 1.36 | 1.16 | 1.03 | 0.63 | 0.13 | 0.12 |
| Viscosity [cP] (Shear rate: 1 $sec^{-1}$) | 1,500 | 2,300 | 3,100 | 5,000 | 20,200 | 38,100 |
| Viscosity [cP] (Shear rate: 20 $sec^{-1}$) | 600 | 600 | 700 | 800 | 1,000 | 2,700 |

As is clear from Table 1, as the amount of added pseudo-plasticity-imparting agent increased, the compositional segregation was more effectively prevented. Particularly when the amount was 1.0 or more, the compositional segregation was remarkably effectively prevented. That is, the compositional segregation at the addition amount of 1.0 was about the half that at the addition amount of 0.5 or less. When the addition amount was 2.0, the compositional segregation was about 1/10, which is remarkably excellent. In the case where the addition amount was 1.0, the viscosity at a shear rate of 20 $sec^{-1}$ was 800 cP, and the viscosity at a shear rate of 1 $sec^{-1}$ was 5,000 cP. The viscosity was measured by means of a viscometer DV-III+ (BROOKFIELD). Also, the case where the addition amount was 2.0, the viscosity at a shear rate of 20 $sec^{-1}$ was 1,000 cP, and the viscosity at a shear rate of 1 $sec^{-1}$ was 20,200 cP.

However, the case where the addition amount was 3.0, the viscosity at a shear rate of 20 $sec^{-1}$ increased (2,700 cP). In this case, the pressure required for casting is elevated, making uniform and continuous casting difficult. As a result, the surface of the molded product becomes to have wavy form, and difficulty is encountered in producing a molded product having a smooth surface.

<Examples of Modifications>

The above-described embodiment and specific examples are, as mentioned above, mere examples of the best mode of the present invention which the applicant of the present invention contemplated at the time of filing the present application. The above-described embodiment and specific examples should not be construed as limiting the invention. Various modifications to the above-described embodiment and specific examples are possible, so long as the invention is not modified in essence.

Several modifications will next be exemplified. In the following description of the modifications, component members similar in structure and function to those of the above-described embodiment are denoted by names and reference numerals similar to those of the above-described embodiment. The description of the component members appearing in the above description of the embodiment can be applied as appropriate, so long as no inconsistencies are involved.

Needless to say, even modifications are not limited to those described below. Limitingly construing the present invention based on the above-described embodiment and the following modifications impairs the interests of an applicant (particularly, an applicant who is motivated to file as quickly as possible under the first-to-file system) while unfairly benefiting imitators, and is thus impermissible.

The structure of the above-described embodiment and the structures of the modifications to be described below are entirely or partially applicable in appropriate combination, so long as no technical inconsistencies are involved.

The urethane precursors are not limited to the aforementioned specific examples. For example, the polyol employed may have another functional group (e.g., a carboxyl group or an amino group) capable of reacting with an isocyanate group. Alternatively, in place of or together with the polyol, there may be employed a substance having, for example, the aforementioned carboxyl group or amino group (the substance may have one alcoholic hydroxyl group). In order to suppress the progress of urethane reaction before molding, a blocking agent may be added to the slurry, or the urethane precursors (e.g., isocyanate) may be provided with a blocking effect.

The present invention is not limited to the case where two or more ceramic raw materials $1a$, $1b$, etc. are contained as shown in FIG. 2A. In other words, even when one ceramic raw material $1$ is contained, compositional segregation of the slurry due to difference in specific weight between ceramic raw material and organic component can be prevented to a minimum possible degree according to the present invention. The organic binder employed is not limited to a urethane resin. A well-known reaction other than urethane reaction (e.g., radical polymerization) may be suitably employed as the chemical reaction for producing the organic binder.

As described in the aforementioned specific examples, a portion of step 3 (drying-solidification step) may be carried out almost in parallel with step 2. Alternatively, the entire step 3 may be carried out almost in parallel with step 2. Alternatively, step 2 and step 3 may be carried out separately (i.e., so as not to overlap with each other).

Step 3 may be a step of performing solidification and drying at one time through heating. Alternatively, step 3 may be carried out at ambient temperature without performing heating. That is, the chemical reaction for producing the organic binder may be promoted by a reaction promoter and application of energy other than thermal energy.

Figure 3A:
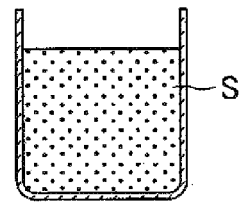
FIGS. 3A to 3D schematically show a modification of the embodiment of the production method shown in FIGS. 1A to 1D.
Figure 3B:
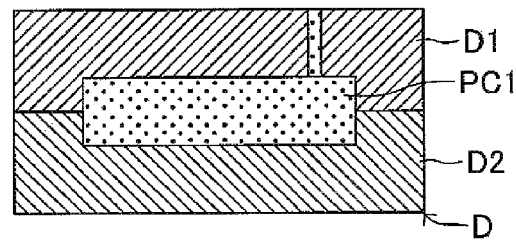
Figure 3C:
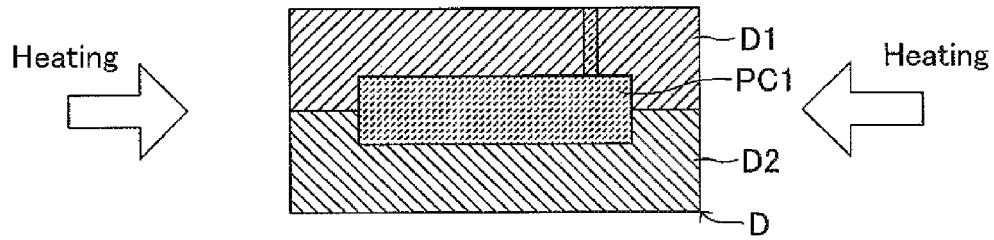
Figure 3D:
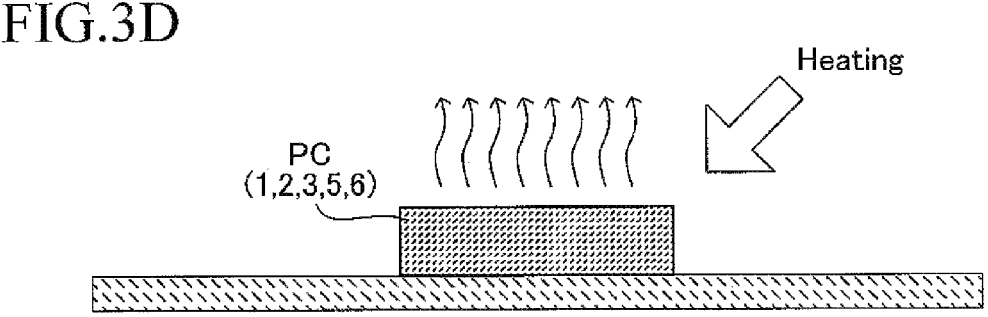

FIGS. 3A to 3D schematically show a modification of the embodiment of the production method shown in FIGS. 1A to 1D. As shown in FIG. 3C, in this modification, gelation can be further promoted by heating a primary molded product PC1 in a die D.

Figure 4A:
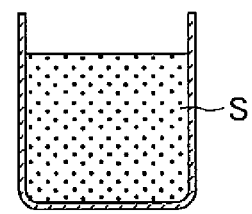
FIGS. 4A to 4C schematically show another modification of the embodiment of the production method shown in FIGS. 1A to 1D.
Figure 4B:
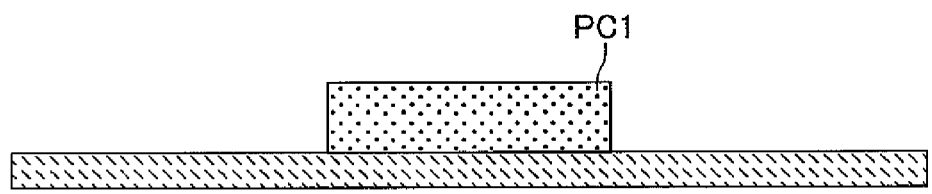
Figure 4C:
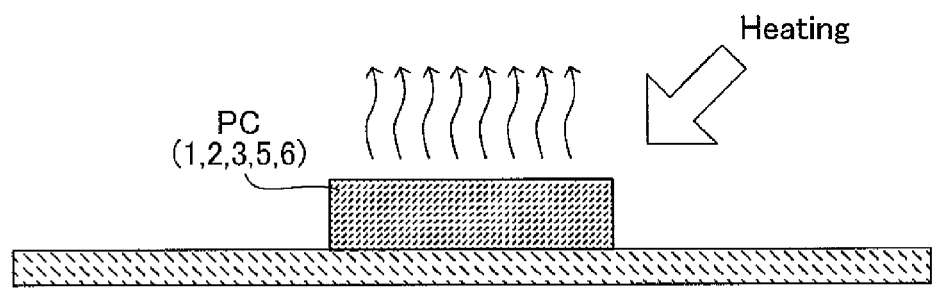

FIGS. 4A to 4C schematically show another modification of the embodiment of the production method shown in FIGS. 1A to 1D. As shown in FIG. 4B, in this modification, step 2 (molding step) is a step of molding a slurry S into a thin-film-like product through the doctor blade method.

Needless to say, those modifications which are not particularly referred to are also encompassed in the technical scope of the present invention, so long as the invention is not modified in essence.

Those components which partially constitute means for solving the problems to be solved by the present invention and are illustrated with respect to operations and functions encompass not only the specific structures disclosed above in the description of the above embodiment and modifications but also any other structures that can implement the operations and functions. Further, the contents (including specifications and drawings) of the prior application and publications cited herein can be incorporated herein as appropriate by reference.

What is claimed is:

1. A method for producing a powder molded product comprising:
   a slurry preparation step of preparing a slurry containing a powdery molding raw material, a dispersion medium for dispersing the molding raw material, a dispersant for uniformly dispersing the molding raw material in the dispersion medium, a binder precursor for producing an organic binder, which is a synthetic resin, through a chemical reaction, and a reaction promoter for promoting the chemical reaction;
   a molding step of molding the prepared slurry into a primary molded product having a specific shape; and
   a drying-solidification step of solidifying the slurry by promoting the aforementioned chemical reaction in the primary molded product, and removing, through evaporation, the dispersion medium from the primary molded product, wherein the slurry contains a pseudo-plasticity-imparting agent for imparting pseudo-plasticity to the slurry,
   wherein the slurry is prepared so as to exhibit a viscosity of 5,000 cP or more at a shear rate of $1 \sec^{-1}$ or less, and a viscosity of 1,000 cP or less at a shear rate of $20 \sec^{-1}$ or more, and
   wherein the slurry contains the pseudo-plasticity-imparting agent in an amount of 1 part by weight to less than 3 parts by weight with respect to 100 parts by weight of the molding raw material.

2. The method for producing a powder molded product according to claim 1, wherein the slurry is prepared so as to exhibit a viscosity of 20,000 cP or more at a shear rate of $1 \sec^{-1}$ or less.

3. The method for producing a powder molded product according to claim 2, wherein the slurry contains the pseudo-plasticity-imparting agent in an amount of 2 parts by weight to less than 3 parts by weight with respect to 100 parts by weight of the molding raw material.

4. The method for producing a powder molded product according to claim 1, wherein, in the drying-solidification step, a urethane resin serving as the organic binder is produced through urethane reaction.

5. The method for producing a powder molded product according to claim 1, wherein the molding raw material contains a first molding raw material and a second molding raw material which differs from the first molding raw material.

6. A powder molded product produced through molding of a slurry containing a powdery molding raw material, a dispersion medium for dispersing the molding raw material, a dispersant for uniformly dispersing the molding raw material in the dispersion medium, a binder precursor for producing an organic binder, which is a synthetic resin, through a chemical reaction, and a reaction promoter for promoting the chemical reaction, wherein the slurry contains a pseudo-plasticity-imparting agent,
   wherein the slurry is prepared so as to exhibit a viscosity of 5,000 cP or more at a shear rate of 1 $\sec^{-1}$ or less, and a viscosity of 1,000 cP or less at a shear rate of 20 $\sec^{-1}$ or more, and
   wherein the slurry contains the pseudo-plasticity-imparting agent in an amount of 1 part by weight to less than 3 parts by weight with respect to 100 parts by weight of the molding raw material.

7. The powder molded product according to claim 6, wherein the slurry is prepared so as to exhibit a viscosity of 20,000 cP or more at a shear rate of 1 $\sec^{-1}$ or less.

8. The powder molded product according to claim 7, wherein the slurry contains the pseudo-plasticity-imparting agent in an amount of 2 parts by weight to less than 3 parts by weight with respect to 100 parts by weight of the molding raw material.

9. The powder molded product according to claim 6, wherein the binder precursor produces a urethane resin serving as the organic binder through urethane reaction, and the reaction promoter is a urethane reaction catalyst.

10. The powder molded product according to claim 6, wherein the molding raw material contains a first molding raw material and a second molding raw material which differs from the first molding raw material.

11. The method for producing a powder molded product according to claim 1, further comprising a defoaming step of defoaming the prepared ceramic slurry after the slurry preparation step and before the molding step.

* * * * *